May 8, 1951      E. R. HOLLOWAY      2,551,837
END THRUST AND TORQUE TRANSMITTING COUPLING
Filed Sept 15, 1948      3 Sheets-Sheet 1
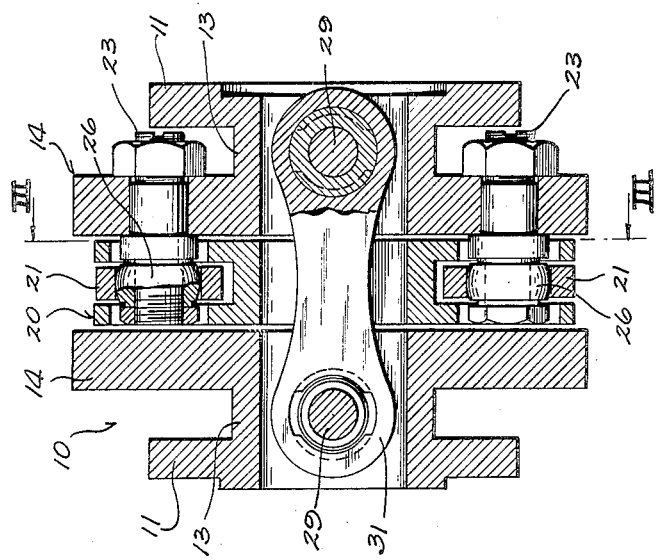
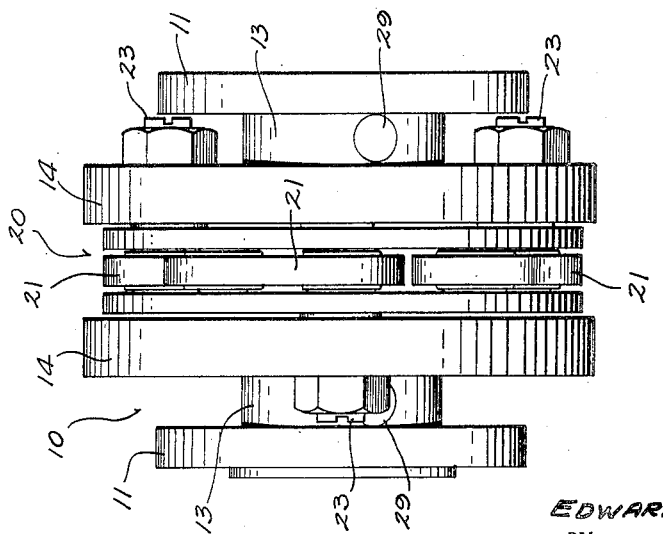
INVENTOR.
EDWARD R. HOLLOWAY
BY
*Miles Kenninger*
ATTORNEY

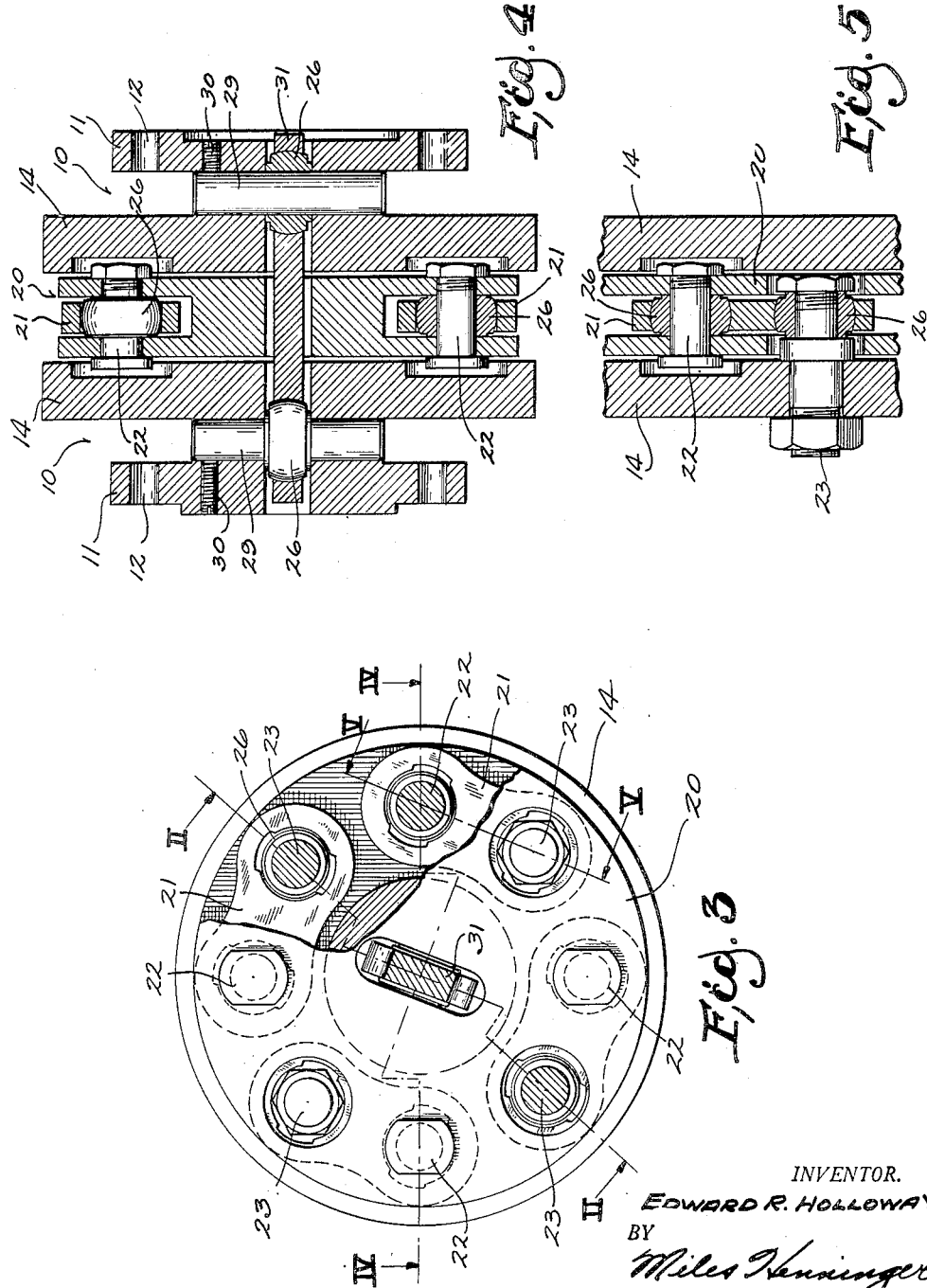

May 8, 1951 E. R. HOLLOWAY 2,551,837
END THRUST AND TORQUE TRANSMITTING COUPLING
Filed Sept 15, 1948 3 Sheets-Sheet 3

INVENTOR.
EDWARD R. HOLLOWAY
BY
Miles Henninger
ATTORNEY

Patented May 8, 1951

2,551,837

UNITED STATES PATENT OFFICE 2,551,837

END THRUST AND TORQUE TRANSMITTING COUPLING

Edward R. Holloway, Milwaukee, Wis., assignor to The Falk Corporation, Milwaukee, Wis., a corporation of Wisconsin Application September 15, 1948, Serial No. 49,347

11 Claims. (Cl. 64—6)

This invention relates to improvements in flexible shaft couplings for transmitting power between two shafts which are not so alined as to be directly connectible, and particularly to flexible couplings for transmitting both torque and end thrust between such shafts.

There are relatively few flexible or universal shaft couplings in use in which both torque and end thrust can be transmitted between the shaft sections. Such couplings as are in use, are not adapted to transmit both torque and end thrusts in both directions with equal efficiency and regardless of the degree or kind of misalinement of the shafts. The combined torque and end thrust transmitting couplings heretofore known, were limited to transmission of thrust in one direction only and were subject to rapid wear of the bearing surfaces which resulted in excessive noise, decreased efficiency and shortened coupling life. Further, the prior couplings were not so constructed that the coupling could be maintained at high efficiency merely by the replacement of a few relatively minor parts.

It is, therefore, one object of the present invention to provide a coupling for transmitting both torque and end thrust between shafts, and regardless of direction of the thrust and of the degree or kind of misalinement of the shafts.

Another object of the invention is to provide a flexible or universal coupling for shafts, which will overcome the defects inherent in prior couplings designed for transmitting both rotary and endwise movement between either angularly or parallel misalined shafts.

Another object of the invention is to provide a torque and end thrust transmitting coupling for imperfectly alined shafts, which may be readily manufactured to close tolerances, which will be quiet and long lived in use, and which can easily be maintained substantially at its original efficiency for transmitting both kinds of forces.

Objects and advantages other than those above set forth will be apparent from the following description when read in connection with the accompanying drawing in which:

Fig. 1 is a side elevation of a coupling according to the present invention.

Fig. 2 is a longitudinal section on the plane of line II—II of Fig. 3.

Fig. 3 is a transverse section on the plane of line III—III of Fig. 2, with a portion of one element of the structure broken away.

Fig. 4 is a transverse section on the planes of broken line IV—IV of Fig. 3.

Fig. 5 is a section on the planes of line V—V of Fig. 3; and

Figure 6:
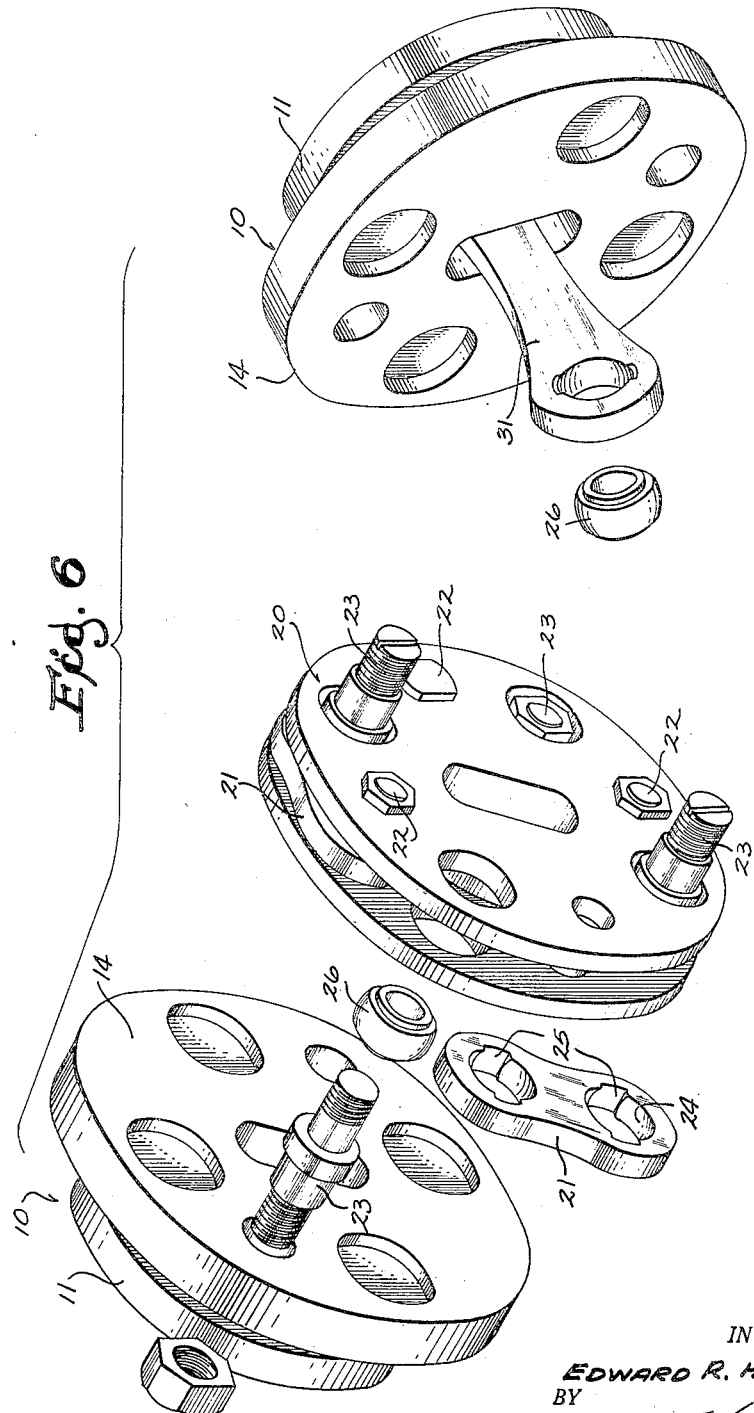
Fig. 6 is an exploded perspective view of the present coupling.

In the drawings in which like numerals are applied to like parts, each of two end members 10 is formed with a flange 11 for connection with a shaft (not shown) as by bolts extending through holes 12 in the flange, a neck portion 13 and a second flange 14 of larger size than flange 11. The two end members 10 are joined in spaced relation for transmitting torque between such end members, the means including a disk 20 interposed between the end members and torque links 21 connecting the end members with the disk in such manner that the disk adjusts itself or floats, in the space between the end members dependent on the degree and kind of imperfection in alinement of the end members and of the shafts on which such end members are fixed.

Bolts 22 in the disk 20, and adjacent the periphery thereof, severally serve as pivots for the one end of the links 21, and bolts 23 extend from adjacent the periphery of the end member flanges 14 as pivots for the other ends of the links. The links have apertures with a spherical surface 24 and with diametric rectangular slots 25 for receiving bearings 26 having a spherical exterior surface for seating in the link apertures and a cylindrical interior surface for bearing on the pivot bolts 22 and 23. It is desirable but not essential that the disk 20 have a peripheral groove to provide space within the exterior limits of flanges 14 for mounting the links. By reference particularly to Fig. 6 of the drawings, it will be seen that the pivots for the connecting links are alternately mounted in the floating disk and in one or the other of the two end members. Hence, each connecting link is connected at one end with the floating disk and at the other end with one of the end members to connect alternate links with different end members.

The end members 10 and the floating disk 20 have a central aperture longitudinally of the completed coupling, the aperture including the axes of the end members and the disk. A pin 29 extends through the neck 13 of each end member so that the axes of the pins intersects the axes of the end members and at right angles thereto. Set screws 30 hold the pins 29 in position while permitting ready removal and replacement thereof. A thrust link 31 is mounted on the pins by means of apertures and bearings at the ends thereof as described for the torque links 21.

Torque is thus transmitted along chords connecting substantially peripheral points of two circles, i. e., each connecting link connects the intermediate disk with one or the other end member. Hence, the disk floats freely between the end members and can so position itself that the torque is transmitted equally amongst the links. Wear on the bearings of the torque transmitting structure is well distributed and minimized and the torque transmitting means can readily be kept at high efficiency.

The means for transmitting thrust between the end members of the coupling is wholly independent of the means for transmitting torque therebetween. The end thrust transmitting bearings are exactly centered on the longitudinal axes of the several end members and permit the thrust link to assume exactly the position for best transmitting the end thrust. The thrust is transmitted by way of relatively large bearing surfaces which minimizes the pressure per unit of bearing area. Hence, the line of thrust force is in its most effective location and wear on the thrust transmitting surfaces is minimized.

It will be seen that insertion of the bearings merely requires placing of the bearings in the aperture slots and then rotating the bearings to bring the spherical bearing surface on the spherical surface of the aperture. Hence, if the bearing surfaces of the pivots and the aperture surfaces of the links are hardened, wear can be taken on the bearings which are relatively simple and are readily replaceable to keep the coupling in the best possible operating condition.

Although but one embodiment of the present invention has been illustrated and described, it will be apparent that various changes and modifications may be made therein without departing from the invention as defined in the appended claims.

I claim:

1. A coupling for joining the adjacent ends of misalined shafts and comprising a pair of members severally fixed on the shaft ends, a link connecting the end members for transmitting longitudinal thrust therebetween, a disk interposed between the end members and connected therewith for transmitting torque therebetween, the end members and the disk having apertures centrally therethrough and substantially alined longitudinally of the coupling, pivots extending into the end member apertures for adjustably mounting the thrust link thereon, and links mounted on the disk and flexibly connecting the end members with the disk for adjustable positioning thereof while transmitting torque between the shafts.

2. A coupling for joining a driving shaft with a driven shaft and comprising end members for mounting on the ends of the shafts, the end members having apertures therethrough including the longitudinal axes of the end members, pins severally mounted in the coupling members and extending across the apertures therethrough and intersecting the axes of the end members, and a link mounted at the ends on the pins for universal angular positioning relative thereto into line with an axial thrust imposed on the coupling.

3. A coupling for joining the adjacent ends of misaligned shafts and comprising end members severally fixed on the shaft ends and having axial apertures therethrough, a link connecting the end members for transmitting longitudinal thrust therebetween and having apertures adjacent the ends thereof, pivots mounted in the end member apertures for adjustably mounting the thrust link thereon, the pivots having spherical surface portions fitting the link apertures, a disk interposed between the end members and connected therewith, and links mounted on the end members and the disk and flexibly connecting the end members with the disk for transmitting torque therebetween.

4. A coupling for joining the adjacent ends of misaligned shafts and comprising end members severally fixed on the shaft ends and having axial apertures therethrough, a link connecting the end members for transmitting longitudinal thrust therebetween and having apertures adjacent the ends thereof, pivots severally mounted in the end member apertures for adjustably mounting the thrust link thereon, the pivots having spherical surface portions within the end member apertures for fitting the link apertures, a disk interposed between the end members and connected therewith, and links mounted on the end members and on the disk and flexibly connecting the end members with the disk for transmitting torque therebetween.

5. A coupling for joining the adjacent ends of misaligned shafts and comprising end members severally fixed on the shaft ends and having axial apertures therethrough, a link connecting the end members for transmitting longitudinal thrust therebetween, pivots mounted on the end members for adjustably mounting the thrust link and extending through the apertures in the end members, a bearing on each pivot within the end member apertures, the bearings being slidable axially on the pivots, a disk interposed between the end members and connected therewith, and links mounted on the end members and on the disk for flexibly connecting the end members with the disk for transmitting torque therebetween.

6. A coupling for joining the adjacent ends of misaligned shafts and comprising end members severally fixed on the shaft ends and having axial apertures therethrough, a link connecting the end members for transmitting longitudinal thrust therebetween, pivots mounted on and extending through the apertures in the end members for adjustably mounting the thrust link in the end member apertures, a disk interposed between the end members and connected therewith, pivots on the end members and on the disk, and links mounted on the end member and disk pivots for severally and flexibly connecting the end members with the disk for transmitting torque therebetween.

7. A coupling for joining the adjacent ends of misaligned shafts and comprising end members severally fixed on the shaft ends and having axial apertures therethrough, pivots mounted on and extending across the end member apertures, a link connecting the pivots and extending through the end member apertures for transmitting longitudinal thrust therebetween, a disk interposed between the end members and connected therewith, pivots on the end members and the disk, and links having apertures adjacent the ends thereof, the pivots having spherical surface portions fitting the apertures in the torque links for severally and flexibly connecting the end members with the disk for transmitting torque therebetween.

8. A coupling for joining the adjacent ends of misaligned shafts and comprising end members severally fixed on the shaft ends and having axial apertures therethrough, a link for connecting the end members for transmitting longitudinal thrust therebetween, pivots mounted on the end members for adjustably mounting the thrust link and extending through the apertures in the end members, a disk interposed between the end members and connected therewith, links for connecting the end members with the disk and having apertures adjacent the ends thereof, pivots on the end members and on the disk for severally connecting the torque links between the several end members and the disk, and a bearing on each of the torque link pivots for mounting the torque links thereon, the bearings having spherical surface portions fitting the torque link apertures and being slidable axially of the pivots.

9. A coupling for joining a driving shaft with a driven shaft and comprising end members for severally mounting on the adjacent ends of the shafts, the end members having apertures therethrough including the longitudinal axes thereof, pins severally mounted in the end members and extending transversely of the apertures for intersecting the axes of the end members, the pins having spherical surface portions within the end member apertures, and a link on the pins for angular positioning responsive to axial thrust on the coupling, the link having apertures adjacent the ends thereof fitting the spherical surface portions on the pins.

10. A coupling for joining a driving shaft with a driven shaft and comprising end members for severally mounting on the adjacent ends of the shafts, the end members having apertures therethrough including the longitudinal axes thereof, pins severally mounted in the end members and extending transversely of the apertures therethrough for intersecting the axes of the end members, a bearing on each of the pins within the end member apertures and having spherical surface portions, and a link having apertures adjacent the ends thereof for mounting on the spherical bearing surface portions for angular positioning of the link responsive to axial thrust imposed on the coupling.

11. A coupling for joining a driving shaft with a driven shaft and comprising end members for severally mounting on the adjacent ends of the shafts, the end members having apertures therethrough including the longitudinal axes thereof, pins severally mounted in the end members and extending transversely of the apertures therethrough for intersecting the axes of the end members, a bearing on each of the pins within the end member apertures and having spherical surface portions, and a link having apertures adjacent the ends thereof for mounting on the spherical bearing surface portions for angular positioning of the link responsive to axial thrust imposed on the coupling, the bearings being axially slidable on their several pins.

EDWARD R. HOLLOWAY.

REFERENCES CITED

The following references are of record in the file of this patent:

UNITED STATES PATENTS

| Number | Name | Date |
| --- | --- | --- |
| 545,353 | Fenner | Aug. 27, 1895 |
| 903,171 | Callan | Nov. 10, 1908 |
| 2,319,027 | Aker | May 11, 1943 |

FOREIGN PATENTS

| Number | Country | Date |
| --- | --- | --- |
| 856,273 | France | 1940 |